US011853340B2

(12) United States Patent
Kumaresan et al.

(10) Patent No.: US 11,853,340 B2
(45) Date of Patent: Dec. 26, 2023

(54) CLUSTERING USING NATURAL LANGUAGE PROCESSING

(71) Applicant: Oracle International Corporation, Redwood Shores, CA (US)

(72) Inventors: Dhileeban Kumaresan, Foster City, CA (US); Sreeji Krishnan Das, Fremont, CA (US); Adrienne Wong, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 194 days.

(21) Appl. No.: 17/183,746

(22) Filed: Feb. 24, 2021

(65) Prior Publication Data
US 2022/0171800 A1 Jun. 2, 2022

Related U.S. Application Data

(60) Provisional application No. 63/119,500, filed on Nov. 30, 2020.

(51) Int. Cl.
*G06F 40/284* (2020.01)
*G06F 40/242* (2020.01)
(Continued)

(52) U.S. Cl.
CPC ............ *G06F 16/355* (2019.01); *G06F 11/32* (2013.01); *G06F 11/3476* (2013.01);
(Continued)

(58) Field of Classification Search
CPC .... G06F 16/355; G06F 11/32; G06F 11/3476; G06F 16/217; G06F 16/285;
(Continued)

(56) References Cited

U.S. PATENT DOCUMENTS

| 10,203,847 | B1 | 2/2019 | Haitani et al. |
| 2006/0129447 | A1* | 6/2006 | Dockery ............ G06Q 30/0204 705/7.29 |

(Continued)

OTHER PUBLICATIONS

Nagappan, Meiyappan, et al. "Abstracting log lines to log event types for mining software system logs." 2010 7th IEEE Working Conference on Mining Software Repositories (MSR 2010). IEEE, 2010, pp. 114-117 (Year: 2010).*

(Continued)

*Primary Examiner* — Jesse S Pullias
*Assistant Examiner* — Michael C. Lee
(74) *Attorney, Agent, or Firm* — Invoke

(57) ABSTRACT

In one aspect, a system receives a request to cluster a set of log records. Responsive to receiving the request, the system identifies at least one dictionary that defines a set of tokens and corresponding token weights and generates, based at least in part on the set of tokens and corresponding token weights, a set of clusters such that each cluster in the set of clusters represents a unique combination of two or more tokens from the dictionary and groups a subset of log records mapped to the unique combination of two or more tokens. The system may then perform one or more automated actions based on at least one cluster in the set of clusters.

20 Claims, 10 Drawing Sheets

(51) Int. Cl.
  *G06F 16/35* (2019.01)
  *G06F 11/34* (2006.01)
  *G06F 16/21* (2019.01)
  *G06F 16/28* (2019.01)
  *G06F 11/32* (2006.01)
  *G06F 16/2455* (2019.01)
  *G06F 16/2457* (2019.01)

(52) U.S. Cl.
  CPC ........ *G06F 16/217* (2019.01); *G06F 16/2455* (2019.01); *G06F 16/24575* (2019.01); *G06F 16/285* (2019.01); *G06F 16/287* (2019.01); *G06F 40/242* (2020.01); *G06F 40/284* (2020.01); *G06F 2201/80* (2013.01)

(58) Field of Classification Search
  CPC .. G06F 40/242; G06F 40/284; G06F 2201/80; G06F 11/3006; G06F 11/321; G06F 11/3409; G06F 11/3447; G06F 16/358; G06F 40/30; G06F 16/353
  See application file for complete search history.

(56) References Cited

U.S. PATENT DOCUMENTS

| | | | | |
|---|---|---|---|---|
| 2009/0100339 | A1* | 4/2009 | Wharton-Ali | G11B 27/322 715/838 |
| 2015/0066814 | A1* | 3/2015 | Allen | G06F 40/30 706/11 |
| 2016/0255236 | A1* | 9/2016 | Roche | H04N 1/2032 358/401 |
| 2017/0060837 | A1* | 3/2017 | Dusberger | G06F 16/313 |
| 2017/0169080 | A1* | 6/2017 | Parthasarathy | G06F 16/248 |
| 2017/0251003 | A1* | 8/2017 | Rostami-Hesarsorkh | G06N 5/01 |
| 2017/0277582 | A1 | 9/2017 | Chen et al. | |
| 2018/0060211 | A1* | 3/2018 | Allen | G06F 40/247 |
| 2019/0065343 | A1* | 2/2019 | Li | G06F 11/3608 |
| 2019/0336767 | A1* | 11/2019 | Klepfer | A61N 1/36564 |
| 2020/0311414 | A1* | 10/2020 | Enuka | G06F 16/353 |
| 2020/0349225 | A1* | 11/2020 | Agrahari | G06F 40/284 |
| 2021/0089377 | A1* | 3/2021 | Wang | G06F 11/0709 |
| 2021/0117232 | A1* | 4/2021 | Sriharsha | G06F 16/256 |
| 2021/0133622 | A1* | 5/2021 | Nidd | G06F 16/258 |
| 2021/0142124 | A1* | 5/2021 | Ollikainen | G06Q 30/0282 |

OTHER PUBLICATIONS

Tang, Liang, Tao Li, et al. "LogSig: Generating system events from raw textual logs." Proceedings of the 20th ACM international conference on Information and knowledge management. 2011, pp. 785-794 (Year: 2011).*

Shima, Keiichi. "Length matters: Clustering system log messages using length of words." arXiv preprint arXiv:1611.03213 (2016), pp. 1-10 (Year: 2016).*

Du, Min, et al. "Deeplog: Anomaly detection and diagnosis from system logs through deep learning." Proceedings of the 2017 ACM SIGSAC conference on computer and communications security. 2017, pp. 1285-1298 (Year: 2017).*

Liu, Kui, et al. "Mining fix patterns for findbugs violations." IEEE Transactions on Software Engineering 47.1 (2018): pp. 165-188 (Year: 2018).*

Dai, Hetong, et al. "Logram: Efficient Log Parsing Using n-Gram Dictionaries." arXiv preprint arXiv:2001.03038 (Jan. 7, 2020). pp. 1-13 (Year: 2020).*

Dwaraki, Abhishek, et al. "Automated event identification from system logs using natural language processing." 2020 International Conference on Computing, Networking and Communications (ICNC). (Mar. 30, 2020), pp. 209-215 (Year: 2020).*

Huang, Shaohan, et al. "Paddy: An event log parsing approach using dynamic dictionary." NOMS 2020-2020 IEEE/IFIP Network Operations and Management Symposium. IEEE, (Jun. 8, 2020), pp. 1-8 (Year: 2020).*

* cited by examiner

402

ORACLE® MANAGEMENT CLOUD Log Analytics emcssadmin

Start typing entity name(s)...

Custom:
Dec 8, 2019 08:04:37.332 PM - Apr 14, 2020...

Log Explorer: SD: Ksplice NLP Cluster

💾 Save ▽ | 📂 Open | ✕ | ❓ | More | ▶ Run

'Upload Name' = emcsadmin.srdas_ksplice | link Time, Entity, 'Event Description' | nlp cluster('Event Description') as 'Cluster ID' |
nlp category = noun, verb, adj, adv wordcount = 5 keywords('Event Description') as Keywords | classify correlate =
-*, 'Event Description','Start Time', Entity, 'Cluster ID', Keywords as 'Patch Cluster Analysis'

| 687 Groups | | 350.6K Log Records | | ⓘ Showing 500 of 687 Groups |

[Analyze ▽] ⚙ Options ▽ 🔍 Show ▽ ❓

| Entity | Event Description | Count ▽ | Start Time | End Time | Cluster ID | Keywords |
|---|---|---|---|---|---|---|
| srdas.subnet1rg2phase.emdevinf raphx1.oraclevcn.com | cve-2019-13631: denial-of-service in gtco calcomp/interwrite tablet | 336 | Apr 5, 2020, 12:19:06 AM | Apr 11, 2020, 11:49:41 PM | -1136131189 | denial, service, tablet |
| srdas.subnet1rg2phase.emdevinf raphx1.oraclevcn.com | kernel crash in megaraid sas firmware crashdump loading | 336 | Apr 5, 2020, 12:19:06 AM | Apr 11, 2020, 11:49:41 PM | 755406930 | crash, kernel, loading, sas |
| srdas.subnet1rg2phase.emdevinf raphx1.oraclevcn.com | xsa-300: denial-of-service in xen memory ballooning | 336 | Apr 5, 2020, 12:19:06 AM | Apr 11, 2020, 11:49:41 PM | 1447680361 | denial, memory, service |
| srdas.subnet1rg2phase.emdevinf raphx1.oraclevcn.com | cve-2018-20169: missing bound check when reading extra usb descriptors | 336 | Apr 5, 2020, 12:19:06 AM | Apr 11, 2020, 11:49:41 PM | -1499167979 | bound, check, extra, missing, reading |
| srdas.subnet1rg2phase.emdevinf raphx1.oraclevcn.com | cve-2019-1125: information leak in kernel entry code when swapping gs | 336 | Apr 5, 2020, 12:19:06 AM | Apr 11, 2020, 11:49:41 PM | -1078758614 | code, entry, information, kernel, leak |

▣ Fields | ▣ Visualize

FIG. 4A ically, which may be comparable to looking for a needle in a haystack.

CLUSTERING USING NATURAL LANGUAGE PROCESSING

CROSS-REFERENCE TO RELATED APPLICATIONS

This application claims the benefit of U.S. Provisional Patent Application 63/119,500, which is hereby incorporated by reference.

Each of the following applications are hereby incorporated by reference as if set forth in their entirety: U.S. application Ser. No. 16/185,588, filed Nov. 13, 2020; U.S. application Ser. No. 14/863,994 filed on Sep. 24, 2015; and U.S. Provisional Patent Application 62/056,073 filed on Sep. 26, 2014.

TECHNICAL FIELD

The present disclosure relates to techniques for processing log files. In particular, the present disclosure relates to clustering log files using natural language processing to provide analytic insights into the behavior of computing resources and to trigger downstream automated actions.

BACKGROUND

Many types of computing systems and applications generate vast amounts of data pertaining to or resulting from the operation of that computing system or application. These vast amounts of data are stored into collected locations, such as log records, which may be subsequently accessed by applications to review the contents contained therein. For example, an application may open a log file that contains various performance metrics for a hardware or software resource.

Server administrators and application administrators may benefit by analyzing the contents of system log records to diagnose system or application behavior. However, mining knowledge from log files can be a very challenging task for many reasons. One challenge is that the size of the log data may be very large, making it inefficient and difficult to analyze the large number of records for the specific items of interest. This may be particularly the case if the interesting entries in the log data are relatively sparse within the larger set of data, which is often the situation since severe problems are usually rare. Moreover, interesting insights may be hidden in sequences of events. The raw evidence to discover these insights may exist in the log files but combining the individual pieces of information together from among the vast set of log data to draw a meaningful conclusion can be a particularly non-trivial task.

The aforementioned problems become even more pronounced in large and complex ecosystems, such as complex enterprise-class database management systems and cloud environments. Such systems may produce very large volumes of data stored in hardware logs, operating system logs, application logs, application server logs, database server logs, and any other type of log that monitors the behavior of a large production system. Furthermore, a similar situation will also exist in a cloud environment, where multiple customers are sharing the same physical resources in a virtualized fashion. Mining knowledge from such log files may be comparable to looking for a needle in a haystack.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4A illustrates an example interactive interface for viewing and navigating between different layers of data extracted from log records according to an embodiment.

DETAILED DESCRIPTION

Figure 1:
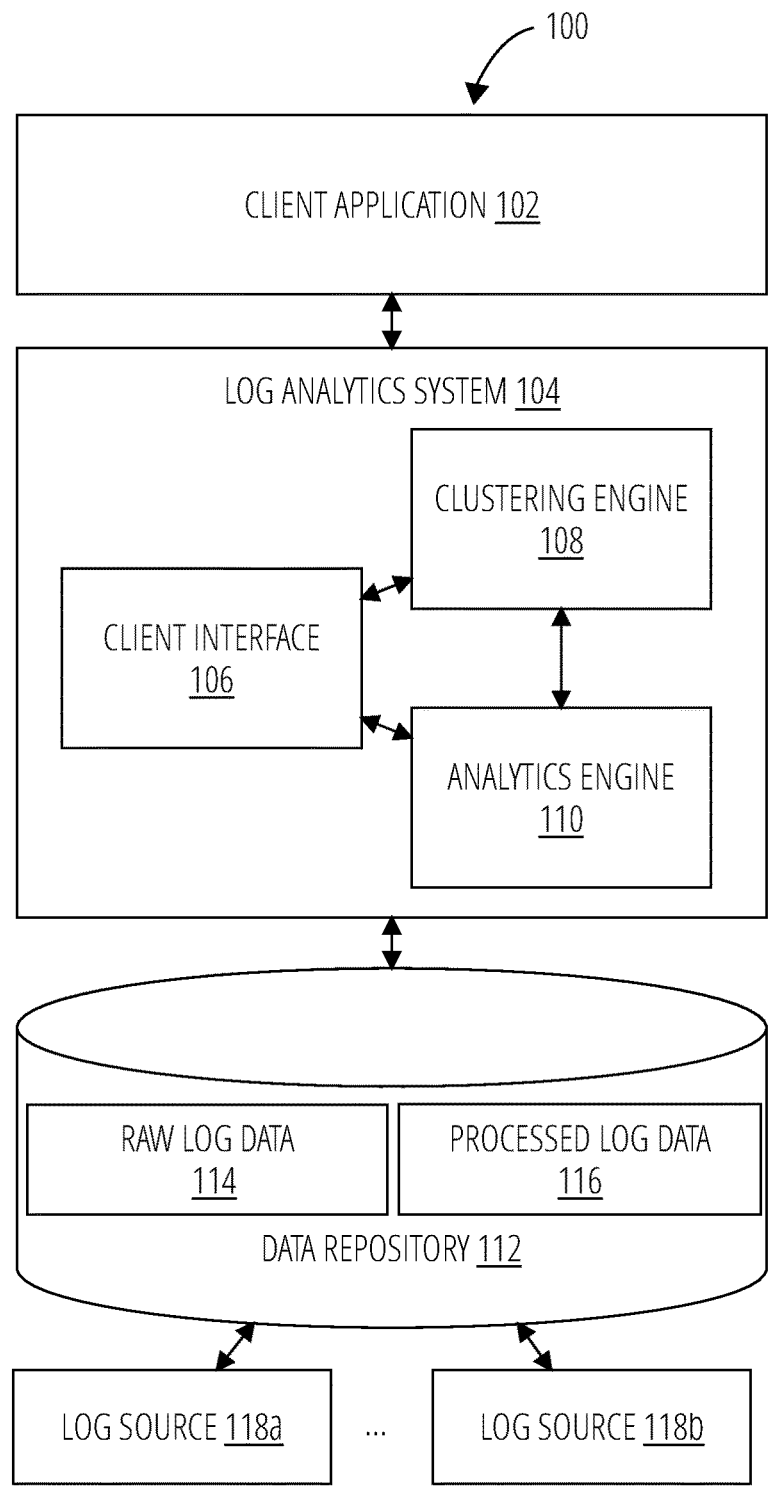
FIG. 1 illustrates an example system for analyzing and classifying sets of data according to an embodiment.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 General Overview

As noted above, many types of computing systems and applications generate vast amounts of data pertaining to or resulting from operation of the computing system or application. The data may be stored in collected locations, such as log records (also referred to herein as log files), which may be reviewed at a later time period to analyze the behavior or operation of the system or application. Embodiments herein provide techniques for efficiently analyzing and performing analytics on large datasets including log records collected over a period of time.

In an embodiment, a log analytics system uses natural language processing (NLP) to generate clusters of similar log records. The NLP techniques may classify the set of log records in a manner that is cohesive and informative to an end user. The NLP techniques may further provide analytic insights into system behavior that would not be feasible for administrators to determine from the vast amounts of raw data. In addition, cluster-based operations may be performed over the groups of log data, allowing for more efficient and effective execution of various operations, such as applying patches and adjusting system configurations and/or other settings.

In an embodiment, the NLP techniques use a dictionary to determine the meaning of text. The dictionary may specify relative weights for certain text (or "tokens") that is more meaningful for clustering purposes than other text. The content of a log file may include human-generated text and/or machine-generated text. All or a portion of the content may be exposed to an NLP analytic, which may parse the text to identify tokens in the dictionary and corresponding token weights. The system may then cluster the log records based on the dictionary tokens and corresponding weights. Each cluster may represent a combination of tokens (e.g., a set of one or more keywords or other text) that is unique relative to other clusters in the set. Thus, the set of tokens for a given cluster distinguishes the cluster from other clusters and provides insights, in a natural language format, into what is unique about the log records grouped in the cluster.

In an embodiment, the NLP analytic assigns weights to textual tokens based, in whole or in part, on sentiment associated with the text. The NLP analytic may weight negative sentiment as more meaningful than positive sentiment. In the context of log analytics, negative sentiment is generally more meaningful as it may indicate an underlying problem that should be addressed. Proper system operation is generally not as interesting to system administrators. Thus, keywords expressing a positive sentiment may be weighted less heavily or ignored. Additionally or alternatively, tokens may be weighted based on one or more other weighting factors, such as domain-specific aspects. For example, a particular keyword may reflect a highly negative sentiment for one application but may not reflect as much negativity or may even be positive in the context of another domain. The weighting factors and manner in which they are applied to tokens may vary depending on the particular implementation and be configurable by an end user.

In an embodiment, dictionaries may include or otherwise be associated with rules that affect clustering operations. As an example, a rule may map a set of one or more keywords or other tokens present in records to a dictionary token. As another example, a rule may define a function for prioritizing or weighting keywords. During clustering, a rule engine may evaluate the rules associated with a dictionary to determine how to group records.

In an embodiment, the system provides a multilayered interactive interface that allows users to drill down into specific clusters to view aggregate information for the cluster. The aggregate information may include a summary that maps to the unique combination of keywords represented by the cluster. Additionally or alternatively, the aggregate information may include attributes that are correlated with the unique combination of keywords represented by the cluster. The multilayered interface may further allow a user to drill down to view individual log records and/or log record metadata. Additionally or alternatively, the multilayered interface may allow a user to trigger automated downstream actions, such as remedies for outliers among the clusters.

While several examples herein are described by way of illustration with respect to "log" data, the techniques are not limited in scope only to the analysis of log data and may be applied to a wide range of data types. The following description may interchangeably refer to the data being processed as "records" or "messages", without intent to limit the scope to any particular format of data.

One or more embodiments described in this Specification and/or recited in the claims may not be included in this General Overview section.

2.0 System Overview

FIG. 1 illustrates an example system for analyzing and classifying sets of data according to an embodiment. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

System 100 includes components for interacting with one or more users. In an embodiment, users interact with log analytics system 104 via client applications, such as client application 102. Client application 102 may comprise software and/or hardware that may be used to operate or interface with log analytics system 104. Client application 102 may execute on one or more digital devices, examples of which include workstations, personal computers, mobile devices, and remote computing terminals. A digital device may comprise a display, such as a monitor or touchscreen, for displaying a user interface to users of client application 102. A digital device may also comprise one or more input devices that allows users to provide operational control over the activities of system 100, such as a mouse or keyboard to manipulate a pointing object in a graphical user interface (GUI) to generate user inputs.

Log analytics system 104 comprises functionality that is accessible to users of client application 102. Log analytics system 104 may be implemented as or include a set of engines or modules to perform clustering and/or analytics. In an embodiment, log analytics system 104 includes client interface 106, clustering engine 108, and analytics engine 110. Clustering engine 108 may perform classification operations to cluster/group raw log data 114. Analytics engine 110 may be used to analyze the grouped log data and trigger automated actions. Examples of such analytics include anomaly detection, diagnostics, sequence analysis, and forecasting.

Client interface 106 is configured to facilitate communication with users via client application 102. In an embodiment, client interface 106 renders user interface elements and receives input via user interface elements. Example interfaces include a GUI, a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, data repository 112 stores raw log data 114 and processed log data 116. Data repository 112 may be any type of storage unit and/or device (e.g., a file system, database, collection of tables, or any other storage mechanism) for storing data. Further, data repository 112 may include multiple different storage units and/or devices. The multiple different storage units and/or devices may or may not be of the same type or located at the same physical site. Further, data repository 112 may be implemented or may execute on the same computing system as one or more other components of system 100. Alternatively or additionally, data repository 112 may be implemented or executed on a computing system separate from one or more components of system 100. Data repository 112 may be communicatively coupled to log analytics system 104 via a direct connection or via a network.

In an embodiment, raw log data 114 is processed by log analytics system 104 to generate processed log data 116.

Raw log data 114 may originate from any log-producing source location, such as log source 118a and log source 118b. For example, raw log data 114 may originate from a database management system (DBMS), database application (DB App), middleware application, web server, or any other log-producing application or system.

Log analytics system 104 may receive instructions or requests from one or more client applications, including client application 102. For example, log analytics system 104 may receive a request from client application 102 to cluster and analyze raw log data 114 within data repository 112. In response, clustering engine 108 may generate a set of clusters, and analytics engine 110 may analyze the data to generate an analytic output. The analytic output may provide insights into the data that are determined through machine-learning, NLP, and/or other analytic techniques. Additionally or alternatively, log analytics system 104 may trigger one or more automated actions responsive to a request received from client application 102, such as remedying outliers among the set of generated clusters.

In an embodiment, log analytics system 104 is implemented as a cloud service or microservice application. Additional embodiments and examples relating to cloud services are described below in Section 6.0, titled "Computer Networks and Cloud Networks." Additional embodiments and examples relating to microservice applications are described below in Section 7.0, titled "Microservice Applications."

3.0 Dictionary-Based Clustering 3.1 Building a Dictionary

In an embodiment, the NLP techniques described herein use a dictionary to cluster records. A dictionary may be any data object that stores a set of tokens and/or rules. In the context of a log record, a dictionary token may be or map to a string of text, such as a keyword or set of keywords, that are contained within the log record. The dictionary may be configured to store only tokens that are meaningful for clustering purposes. Tokens that are not meaningful may be ignored or discarded from the dictionary. However, the dictionary may also be configured to store all tokens extracted from a set of records, depending on the particular implementation.

In an embodiment, the dictionary associates weights with each dictionary token. A token's weight may indicate how meaningful the token is for clustering and analytic operations. Weights may be assigned on a normalized scale, such as from 1 to 0, where 1 indicates a significant weight, 0 indicates no weight. Non-integer values closer to 1 may be weighted more heavily than values closer to 0. However, the weight values, scale, and units may vary depending on the particular implementation.

Additionally or alternatively, the dictionary may define or otherwise be associated with a set of one or more rules. Example dictionary rules are described further below in Section 3.4, titled "Dictionary Rules."

Figure 2:
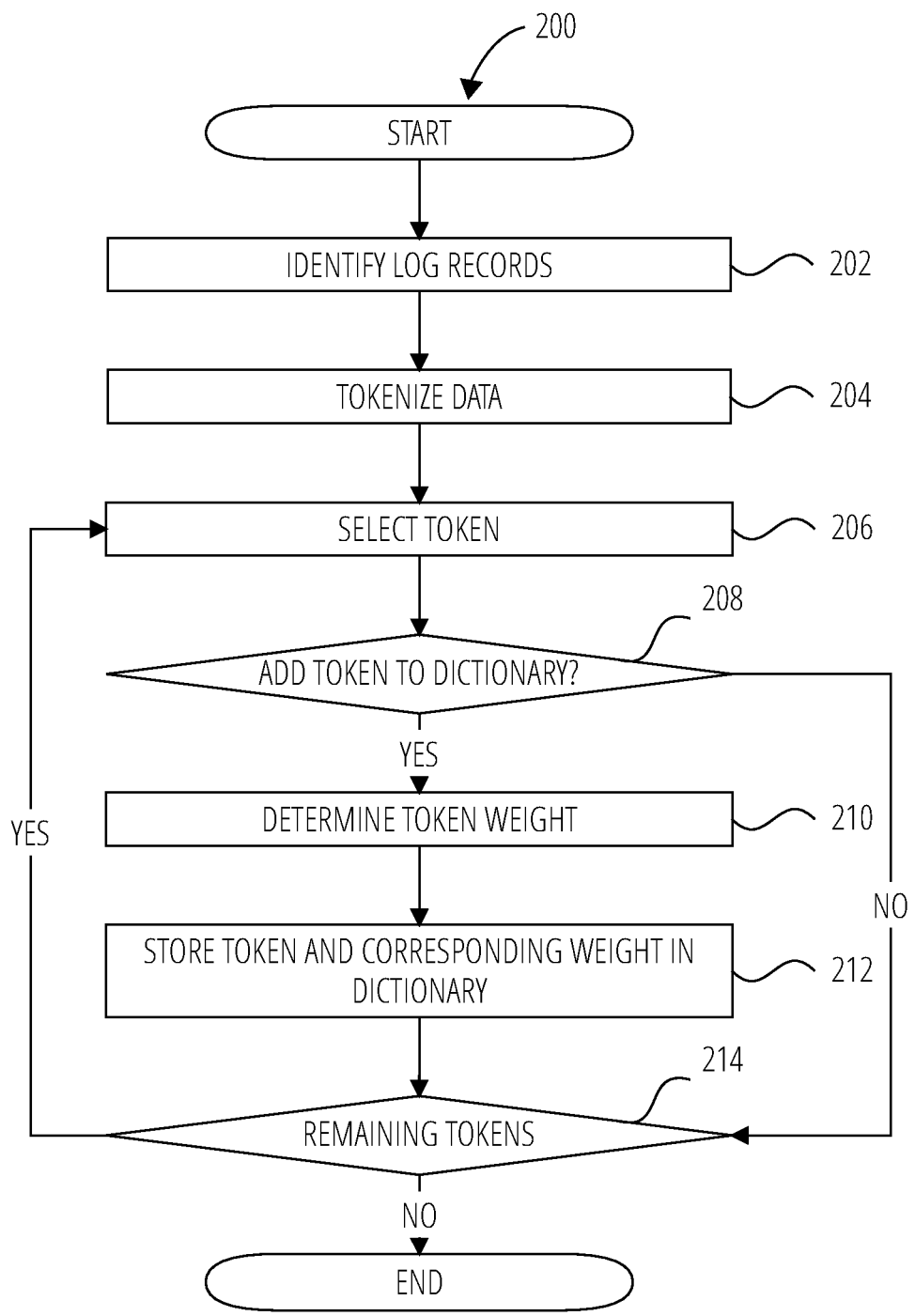
FIG. 2 illustrates an example process for building a dictionary according to an embodiment.

FIG. 2 illustrates example process 200 for building a dictionary according to an embodiment. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, process 200 identifies a set of log records (operation 202). The set of log records may originate from one or more log-producing source locations, such as log source 118a and log source 118b. Example log-producing source locations include a DBMS, a DB app, a middleware application, a web server, hardware logs, operating system logs, application logs, application server logs, database server logs, and any other type of log that monitors the behavior or a system or application.

Process 200 further tokenizes the data within the log record (operation 204). Tokenization may include demarcating and classifying a string of input characters contained within a log record. In an embodiment, tokenization uses lexical analysis to extract keywords from a log record. For example, the log message "Server FOO is down" may extract four tokens as follows <record><keyword>Server</keyword><keyword>FOO</keyword><keyword>is</keyword><keyword>down</keyword></record>. The number and token values that are extracted may vary from one message to the next.

Process 200 may further select an extracted token for further processing (operation 206). Process 200 may iterate through the tokens in any predetermined or arbitrary order.

Process 200 determines whether to add the selected token to the dictionary (operation 208). Process 200 may make the determination based on predefined rules, machine learning, domain-specific parameters, and/or some combination thereof. In an embodiment, process 200 may exclude tokens that frequently occur within log records. For example, if a token occurs in all log records (or more than a threshold, which may be configurable), then it is indicative that the token does not convey much meaning for purposes of distinguishing clusters of log records. Thus, such tokens may be excluded from the dictionary. Additionally or alternatively, process 200 may exclude tokens that occur on a predetermined list of tokens and/or based on part of speech. For instance, a user may define a list of tokens that should be excluded from the dictionary. As another example, process 200 may exclude articles (e.g., a, the, an) and/or conjunctions (e.g., or, and) as these parts of speech may not be meaningful for clustering in some applications.

If the token is to be added to the dictionary, then process 200 determines a weight for the token (operation 210). As previously mentioned, the token weight may reflect and be assigned based on how meaningful the token is for clustering. Process 200 may determine the weights based on a sentiment reflected by the token, uniqueness of the token, token context, predefined rules, patterns automatically determined through machine-learning, and/or domain knowledge injected into the system. Additionally or alternatively, other factors may influence the weight, such as attributes associated with the log records or log metadata.

In other embodiments, process 200 may determine the weight for the token before determining whether to add a selected token to the dictionary. Process 200 may then retain the top n tokens in the dictionary or only tokens with weights satisfying a threshold. Other tokens may be discarded or otherwise not stored in the dictionary.

If the selected token satisfies the criteria for being incorporated into the dictionary, then process 200 stores the selected token and corresponding weight in the dictionary (operation 212).

Process 200 next determines whether there are any remaining tokens (operation 214). If so, then process 200 returns to operation 206 and repeats the analysis for the remaining tokens. Once complete, the process stores the dictionary, which may be used for clustering operations as discussed further herein.

3.2 Weighting Tokens Based on Sentiment and Other Factors

In log analytics, negative sentiment is often more meaningful to detect and remedy underlying problems within a computing system. For example, if a DBMS, server, or other computing resource is experiencing problems, the log records generally include keywords that reflect a negative sentiment, such as "outage", "error", "down", etc. During proper system operation, the occurrence of negative keywords within log records is much less frequent. Thus, weighting tokens based on sentiment may facilitate quick isolation and identification of performance degradation and/or other problems within a system.

In an embodiment, sentiment weights are assigned according to predefined rules. A rule may map one or more keywords to a corresponding weight indicative of sentiment associated with the one or more keywords. The rules may be specified by a user or domain expert. In other embodiments, the rules may be generated through machine learning algorithms. For example, a machine learning process may train a model, such as a neural network or support vector machine, based on a set of example log records that have been labeled negative and/or positive. The model weights assigned during the training process may be normalized and incorporated into the dictionary as token weights for use during clustering operations as described further herein.

In an embodiment, sentiment weights account for context associated with the log records. For example, negative sentiment may influence a weight more significantly for lower-level log-producing sources (e.g., DBMS, hardware logs, operating system logs) within a multitier application than higher-level log-producing sources (e.g., social media applications, presentation tier applications). A negative sentiment at a lower tier of an application stack is oftentimes more consistently indicative of a problem than at a higher level within the application stack. For instance, a negative keyword in a social media record may not be indicative of problems within the application stack whereas certain negative keyword in a DBMS log may consistently be associated with an underlying issue. Thus, log analytics system 104 may be configured to account for the context, through rules and/or machine-learning, when assigning weights.

Additionally or alternatively, dictionary tokens may be assigned weights based on one or more factors other than sentiment. As an example, different categories of tokens may be weighted different. For instance, certain parts of speech may be weighted more heavily than other parts of speech. Example token categories are described in Section 3.3, titled "Token Categories." As another example, tokens may be weighted based on the log-producing source. Tokens extracted from log data generated by one trace provider may be given more weight than tokens extracted from log data generated by another trace provider.

In an embodiment, a token weight may be computed by aggregating weight values associated with different factors. For example, an aggregate weight may be computed by averaging or otherwise aggregating a sentiment weight and token category weight for an extracted token. Additionally or alternatively, other weight values may be factored into the aggregate weight.

In an embodiment, dictionary tokens are automatically sorted by weight. The sorted tokens may be presented to an end user to show which tokens are most heavily weighted and associated with a negative sentiment. Additionally or alternatively, the sorted tokens may be used to optimize clustering operations as described further below.

3.3 Token Categories

In addition or as an alternative to token weights, a dictionary may associate a token with one or more token categories. Token categories may be used for clustering and/or filtering operations. For example, a user may request clustering using only keywords from a dictionary that belong to a particular category or combination of categories. Dictionary keywords that do not match the specified category conditions may be given little or no weight during clustering. As another example, a user may filter clusters to highlight groupings of records that map to a particular category or combination of categories.

In an embodiment, the token categories include semantic and/or syntactic categories. A semantic category may classify tokens based on the meaning of keywords or sequences of keywords within a corpus of records. For instance, certain keywords that are associated with a unifying concept may be mapped to a classifier for the concept. As an example, keywords related to a particular type of operation, such as a backup or migration operation, may be assigned a corresponding classifier (e.g., "backup", "migration") that identifies the operation.

A syntactic category may include categories relating to natural language rules or grammar. For example, a syntactic category may include the part-of-speech of the token, such as a noun, verb, adjective, or adverb. As another example, a syntactic category may correspond to the position of the token within a record or sentence.

Additionally or alternatively, a keyword may be classified into one or more other categories. As an example, a category may include a field name that identifies what field the token value was extracted from in the log data. As another example, a category may identify the source generating the token, such as an operating system, server, or other computing resource. Additionally or alternatively, one or more token categories may be specified as clustering parameters as discussed further herein. As another example, tokens may be assigned weights based on which source generated the log data.

In an embodiment, user-defined categories may be added to the dictionary. For example, a user may select, via a user interface (UI) or API, "add category" or "remove category" for a selected dictionary. Thus, the user may use the UI or run an API to fine tune the categories of the tokens in existing dictionaries.

3.4 Dictionary Rules

As previously mentioned, a dictionary may define or otherwise be associated with a set of one or more rules. In an embodiment, a rule comprises logic that affects clustering operations when the associated dictionary is used by the clustering process. For example, a rule may be evaluated to (a) map record content to dictionary tokens, (b) compute weights, (c) determine record similarity and/or (d) assign records to groups. Rules may be customizable through machine-learning and/or user specified logic to tailor clustering operations to a specific domain.

In an embodiment, a rule may assign disparate keywords to the same token. For example, a rule may map synonyms, homonyms, and/or roots with the same dictionary token. The rule may cause the dictionary to store links between keywords that have substantially identical meaning (e.g., "stopped" and "halted") or that share the same roots (e.g., "request", "requests", "requesting", "requested"). As another example, the keyword "spoon" is a hyponym of "cutlery". A rule may create a link in the dictionary indicating how the two keywords are related. The clustering process may use the links to consider similar words when forming clusters.

In an embodiment, the synonyms, homonyms, and/or roots that are linked in a dictionary may be exposed to and configurable by an end user. For example, a user may remove a link between keywords so that the keywords are not treated similarly. Additionally or alternatively, a user may add links to indicate similarity between keywords.

Additionally or alternatively, complex rules may be defined to compute token weights, similarity scores, and/or group records as a function of several different factors. The rules may account for semantics, syntax, sentiment, and/or other factors to compute token weights or similarity scores. The rules may be evaluated and applied to the corpus of documents at cluster runtime to dynamically assign weights or similarity scores. For instance, a rule that factors in the frequency of a given keyword may assign the token "stopped" a high weight in one corpus of log records if relatively uncommon but a lower score for another corpus of log records if it is relatively common. Thus, the scores for a given dictionary token may vary from one corpus of records to the next depending on the record attributes.

In an embodiment, system 100 may use machine learning to learn similarities between keywords. Based on the learned similarities, the machine learning engine may automatically recommend and/or add rules and/or links to the dictionary. The machine learning engine may be configured using training data specific to a particular domain to learn domain-specific patterns. For example, rules for a database dictionary in a production environment may be different from rules for a database dictionary in a test environment or a different production environment. Machine learning models, such as neural networks and support vector machines, may learn domain-specific patterns without requiring the rules to be hard-coded into the system.

3.5 Generating Clusters

Figure 3:
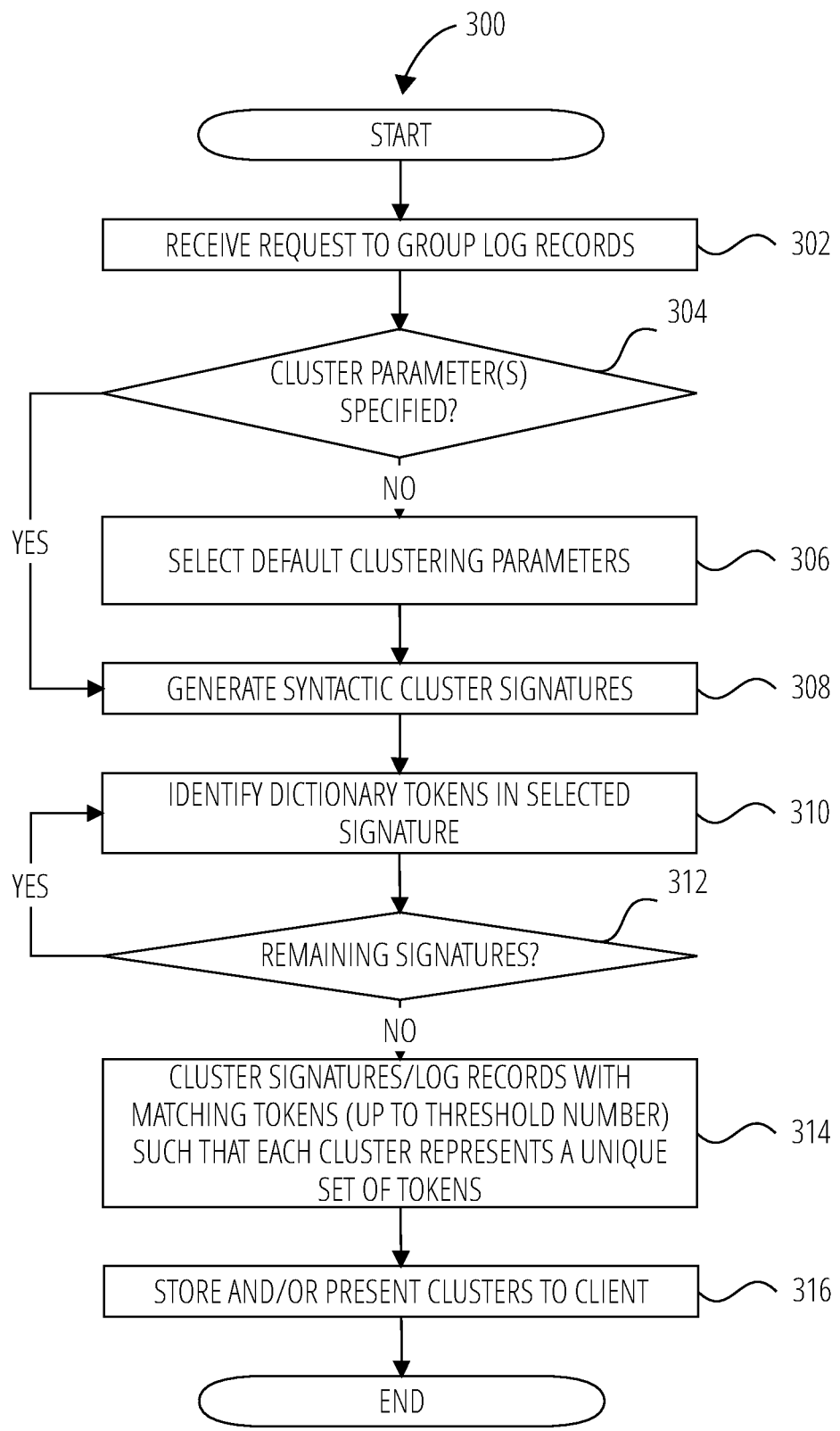
FIG. 3 illustrates an example process for performing dictionary-based clustering of log records according to an embodiment.

Once built, a dictionary (or set of dictionaries) may be used to perform clustering operations to group records based on keyword similarities. FIG. 3 illustrates example process 300 for performing dictionary-based clustering of log records in accordance with an embodiment. One or more operations illustrated in FIG. 3 may be modified, rearranged, or omitted all together. Accordingly, the particular sequence of operations illustrated in FIG. 3 should not be construed as limiting the scope of one or more embodiments.

Process 300 receives a request to group log records (operation 302). For example, the request may be submitted by client application 102.

Responsive to the request, process 300 determines whether the request specifies any cluster parameters (operation 304). For example, process 300 may parse the request to determine whether it specifies the number of tokens, token categories, and/or other token parameters to use for clustering. Additionally or alternatively, process 300 may check for other clustering parameters, such as a range of time, log source, and dictionary to use for clustering.

If the request does not specify a cluster parameter, then process 300 selects a default value for the cluster parameter (operation 306). For example, a default number of tokens to use for clustering may be predefined. If a token category is not specified, then clustering may be performed across all categories. Additionally or alternatively, a default time range, log source (or set of log sources), and/or dictionary (or set of dictionaries) may be selected. However, the default values may vary depending on the particular implementation and may be configurable by an end user.

Process 300 further generates syntactic cluster signatures for log records subject to the request (operation 308). The generation of syntactic cluster signatures may be viewed as a form of log reduction to expedite the overall clustering process. A signature may be generated as a function of word positions and exact word matches. For example, a system may generate the following six log records:

Log 1: Authenticating user u1
Log 2: Authenticating user u2
Log 3: Authenticating user u3
Log 4: User authentication successful for user u1
Log 5: User authentication successful for user u2
Log 6: User authentication successful for user u3

The following two syntactic cluster signatures may be generated for the above six log records:

Sig. 1: Authenticating user <var>
Sig. 2: User authentication successful for user <var>

In this example, the above two signatures may be passed as candidates for the dictionary-based clustering rather than all six log records, which reduces processing overhead and speeds up the NLP clustering process. However, in other embodiments, the NLP clustering process may operate directly over all six log records.

In an embodiment, process 300 identifies records subject to the request based on the cluster parameters. For example, process 300 may identify which log records fall within a specified range of time, originate from a particular log-producing source (or set of sources) and/or otherwise satisfy specified criteria. The source and/or log records used to build/tune a dictionary may differ from the source and/or log records subject to the clustering operations. In other cases, the log records may be the same or overlap.

Process 300 further identifies/extracts the dictionary tokens from a selected cluster signature, which may represent one or more log records, or a selected log record (operation 310). During this operation, process 300 may parse the signature or log record to search the text for keywords contained within one or more dictionaries. Process 300 may further search for synonyms, hyponyms, roots, and/or other relationships between the dictionary tokens.

Additionally or alternatively, process 300 may evaluate the rules defined for the dictionary. For example, process 300 may apply a rule to map a keyword (or combination of keywords) within a record to a dictionary token. As another example, process 300 may apply a rule to compute token weights from the extracted tokens or similarity scores for the records.

In an embodiment, process 300 determines whether there are any remaining signatures/log records subject to the request to process (operation 312). If so, then the process returns to operation 308 and iterates through the remaining signatures or log records to identify the dictionary tokens associated with each signature or record.

Once the dictionary tokens have been identified, process 300 clusters the signatures/log records, grouping signature/records with matching tokens such that each cluster represents a unique set of one or more tokens that distinguishes the cluster from other clusters in the set (operation 314). In an embodiment, process 300 uses up to a threshold number of tokens to perform the clustering. For example, if three tokens are specified, then each cluster may represent a unique combination of up to three tokens.

In an embodiment, a signature and/or log record may be assigned to more than one cluster. For example, if a log record includes the unique combination of keywords represented by different clusters, the log record may be assigned to each of those clusters. In other embodiments, the log record may be assigned only to one cluster, which may be selected based on which tokens are most highly weighted. In this case, the log record may be assigned to a first cluster where the overall or average weight of the unique combination of tokens represented by the cluster is greater than a second cluster even though the log record may include the combination of tokens from both clusters.

In an embodiment, process 300 analyzes log records to search for synonyms, hyponyms, and/or roots when performing clustering operations. In one aspect, process 300 may assign a record to a cluster even if it does not exactly match the unique combination of keywords associated with the cluster if the record includes synonyms, hyponyms, and/or roots for each keyword missing from the log record. For instance, a cluster may represent the unique combination of keywords <request, denied, fault>. A log record containing the keywords "denied" and "fault" may still be assigned to the cluster if it includes the keyword "requesting" as it is similar to "request". Process 300 may determine which keywords are similar based on links in the dictionary, as previously described. In other embodiments, process may assign a record to a cluster if and only if the record contains an exact match of all keywords.

Additionally or alternatively, process 300 may consider token categories when performing clustering operations. As an example, a user may request the clustering be performed only using nouns and verbs. In response, process 300 may use only dictionary tokens that are classified as nouns and verbs to generate the clusters. Thus, the unique combination of keyword represented by each cluster may exclude other parts-of-speech, such as adverbs. Additionally or alternatively, process 300 may use only dictionary tokens that are classified into other categories, which may include user-specified categories. This allows clustering to be controlled by token categories, which may present different insights into the data based on which subset or combination of token categories are selected.

Additionally or alternatively, process 300 may apply rules when performing clustering operations. For example, a dictionary may specify domain-specific rules for computing similarity between log records. Process 300 may then group the log records such that log records are more likely to be grouped with similar log records than dissimilar log records, as reflected by the similarity scores.

In an embodiment, process 300 may apply rules to determine how to map dictionary tokens extracted from the corpus of log records to dictionary tokens. The rules may control which disparate keywords, if any, are mapped to the same dictionary token. As previously mentioned, the rules may be generated by a machine learning model. In this case, the machine learning model may be trained, using a labeled or unlabeled training dataset, to determine which tokens have similar meaning within a particular domain. The machine learning model may then establish links in the dictionary for disparate tokens that are estimated to have a threshold level of similarity.

Additionally or alternatively, process 300 may apply rules to compute token weights. For example, a rule may define a weight computation by averaging or otherwise aggregating a sentiment score (e.g., 1 is highly negative and 0 is highly positive), a log source score (e.g., 1 is a highly prioritized source and 0 is a low priority source), and/or other normalized weighting factor scores. The computed weights may be used to select which dictionary tokens to use for the clustering process, as previously described.

In an embodiment, process 300 assigns a cluster identifier to each log record assigned to a cluster. The cluster identifier may be a string or other value that uniquely identifies the cluster relative to other clusters. The cluster identifier may be used for filtering, presentation, and other operations. For example, filtering and/or other operations may be executed with respect to all records that have a given cluster identifier.

Once the clusters have been generated, process 300 stores and/or presents the clusters to the user (operation 316). Example interfaces for presenting and interacting with the clustered records are described further below.

3.6 Clustering Based on Word Embeddings

The clustering operations described above may operate on string values for the tokens and/or word embeddings, depending on the particular implementation. When operating on string values, records may be assigned to a cluster only if the records include a matching string value or a similar string value, such as a synonym or hyponym, if it is linked via rules associated with the dictionary. Word embeddings allow a degree of contextual similarity or meaning between different words to be factored into the grouping of records.

In an embodiment, a dictionary may comprise a set of word embeddings where a word embedding is a numeric representation, such as a real-valued vector, of a word in a given context. With word embeddings, the same keyword may be mapped to different embeddings depending on context. For example, the keyword "outage" may be mapped to a different embedding depending on its position in a log record, what other words surround the keyword (e.g., whether "network", "database", or another word precede or succeed the keyword), and/or other factors indicative of the semantic meaning of the keyword. Word embeddings may be assigned such that a vector for a dictionary token may have a smaller Euclidean distance and/or greater cosine similarity to another vector in the vector space for a token that has a more similar semantic meaning than for a token that is not as similar. Example word embedding models include continuous bag-of-words and continuous skip-gram models, which are designed to map words to real-valued vectors based on linguistic context determined through natural language processing. However, other NLP and/or ML models may be applied to generate the word embeddings.

During clustering operations, the dictionary of word embeddings may assign records to the same group even though the keywords may not exactly match if the semantic meanings of the keywords are similar. As previously indicated, similarity may be determined based on the Euclidean distance or cosine similarity between different embeddings. As a result, the set of one or more keywords represented by a cluster may not exactly match the keywords of the records assigned to the group. However, the semantic meaning conveyed by the keywords may be substantially similar (e.g., within a threshold Euclidean distance or cosine similarity) of the word embeddings included in the matched records.

3.7 Cluster-Based Analytics and Operations

Analytics engine 110 may be configured to perform various operations on clustered log data. In one embodiment, analytics engine 110 may be configured to generate summaries for one or more clusters based on the unique set of one or more keywords in each cluster. The summary may comprise one or more sentences and/or sub-sentences that describe a behavior represented by the pattern. For example, a particular pattern of keywords may represent a high likelihood of a known problem in an application. A summary may be mapped to these keywords. If the clustering operations above produce a cluster representing the keywords, then the summary may be presented to the user to identify the problem.

Additionally or alternatively, one or more actions may be mapped to combinations of keywords or cluster summaries. Different combinations of keywords and/or different cluster summaries may be mapped to different actions. For example, a cluster representing the keywords network, latency, outage may be mapped to an action for adjusting network settings and/or applying a patch. As another example, a cluster representing the keywords active, session, exceeded may be mapped to an action for migrating tenants to rebalance resource allocation within a cloud environment. The actions that are mapped may vary depending on the particular implementation.

In an embodiment, the actions that are mapped to a particular set of keywords or cluster summary may be automatically recommended to an end user, such as a system administrator. System 100 may generate a link to present to the user based on which action has been selected for a particular cluster. The user may select the link, via a UI or API, to execute the recommended action. System 100 may determine which resources are affected based on the log records in the cluster. For example, system 100 may identify a set of resources to patch based on which sources generated the log records or which resources are identified within the log records.

In an embodiment, users may configure actions to automatically trigger based on certain keyword combinations. The user may map a set of one or more keywords to a corresponding action. The user may specify whether the action should trigger automatically or should be presented to a user for further review before execution. If the clustering operation produces a cluster representing the keyword combination, then the automated action may be triggered or presented to the user for further review, depending on the user specification. Example actions that may be triggered include bringing a resource offline, patching the resource, migrating data, backing up data, and adjusting configuration settings.

In an embodiment, actions may be set to trigger based in part on token weights. For example, if the clustering operations yield a cluster associated with highly negative-weighted keywords, then the resource may be brought offline and/or patched to mitigate potential issues such as performance degradation and security flaws.

Additionally or alternatively, analytics engine 110 may recommend or trigger actions based on which clusters are outliers. Outliers clusters may be determined based on (a) distance from other clusters and/or (b) the number of records in the cluster. In many instances, outlier clusters may be indicative that one or more resources have departed from expected behavior. Thus, the outlier clusters may be highlighted, along with summaries and recommended actions, to quickly isolate potential problems and bring them to the attention of a user.

The clustering techniques may further be applied to sources other than log data. For example, log analytics system 104 may ingest the text of Service Requests (SRs) or tickets filed by end users. The clustering process may then be applied to the SRs to group "similar" or "same" issues even though the text written by the users in the SRs may not be exactly identical. Thus, the clusters provide the ability to automatically identify similar issues and the unique varieties of issues filed by the users in a given time period.

In an embodiment, the clustering process may further be performed over multiple sources, and analytics engine 110 may find connections between the two sources for further analysis. For example, the clustering process may be applied to SRs and the log records pertinent to the environments mentioned in the SRs. Analytics engine 110 may then link the problems indicated in the SRs to corresponding environments. The clusters of log data associated with the environment may then be used to debug any underlying issues. Additionally or alternatively, analytics engine 110 may identify other environments where the same or similar issues exist but for which the end users have not yet filed SRs or tickets. Analytics engine 110 may then proactively trigger patches or other remedies to address the similar issues before the end user submits a service ticket.

4.0 Additional Natural Language Processing Techniques 4.1 Dictionary Variance and Tuning In an embodiment, domain-specific knowledge may be injected into the construction and tuning of a dictionary. In one aspect, domain-specific dictionaries may be built for different sources of log data. For example, one dictionary may be built for a DBMS, another for a middleware application, another for a web server, etc. Each domain-specific dictionary may define different keywords/tokens, weights, rules, and/or links (e.g., which keywords are similar). Thus, the keywords and associated weights that are used to cluster records from one layer of a multitier application may differ from another layer in the multitier application.

Additionally or alternatively, dictionaries may vary based on various domain-specific attributes, such as the environment where the records are generated and a role of a user requesting the clustering. For example, a database administrator may have access to use a different dictionary then a network administrator. The database administrator may define different dictionaries for different database hosts based on the DBMS version, operating system, hardware platform, and/or other resource attributes.

Additionally or alternatively, different dictionaries may be built to address different problem spaces. For example, a dictionary may include and/or weight tokens differently to analyze log records for a particular type of network problem. Different dictionaries may be used to search for other problems, such as I/O throughput and latency issues.

In an embodiment, users may tune dictionaries, weights and/or links. For example, a user may submit, via a UI or API, a request to add or remove a dictionary token from a dictionary. The UI may allow the user to view individual log messages and select keywords contained therein to add to the dictionary. Additionally or alternatively, the user may adjust how the tokens in the dictionary are weighted and/or define relationships between the tokens. The user may further be given control to create new dictionaries, import dictionaries from another source, and delete the dictionaries that are used for clustering.

In an embodiment, log analytics system 104 may use machine learning to tune a dictionary based on user preferences. For example, log analytics system 104 may present the user with the text of a log message, an indication of which keywords were extracted as tokens, and a reason why the tokens were extracted. The user may be presented with an option to confirm or override the reason/rule for adding tokens. The rules may be field-specific (e.g., for a field within a log record, the user may add or stop rules for adding keywords to the dictionary) and/or context-specific (e.g., for a particular log-producing source, the user may add or stop rules for adding keywords to the dictionary).

4.2 Hierarchical Cross-Dictionary Clustering

In an embodiment, dictionaries may be defined that link disparate dictionaries together for clustering operations. For example, different dictionaries may be specified for a DBMS and a middleware application. A "parent" dictionary may control how tokens in the DBMS dictionary are related to tokens in the middleware dictionary. When clustering operations are run across both DBMS logs and middleware logs, the parent dictionary may be used to group logs originating across the different sources/domains. The "child" dictionaries may be used to cluster logs from the same source or domain.

In an embodiment, a "parent" dictionary may also be a child of another dictionary. For example, the "parent" dictionary that links the DBMS and middleware application may be a child to another dictionary that links it to a dictionary definition tokens for a web server. Thus, the hierarchy of dictionaries may run several layers deep.

In an embodiment, clustering operations may group records based on differences and/or commonalities between the dictionaries. For example, client application 102 may request log records be grouped only using tokens found in one dictionary but not the other or tokens only found in both dictionaries.

5.0 Multilayered Interactive Interfaces

In an embodiment, the set of clusters are presented via an interactive interface to a user. The interactive interface may allow a user to view and drill down into different layers of varying granularity. For example, an upper layer may present all or a subset of clusters with reference to one or more dimensions, such as the time range and native source of the log data. Additionally or alternatively, the upper layer may allow a user to filter and isolate clusters based on one or more dictionary keywords. Clusters that do not match the filter set of keywords may be removed from view to isolate clusters of interest in the presentation user interface.

In an embodiment, the user may click on, hover over, or otherwise select a cluster to view another layer of the interface that presents more detailed aggregate information about the cluster. According to one aspect, the user may select a cluster to view a combination of dictionary keywords for a cluster, which may be presented responsive to the selection. Additionally or alternatively, the combination of dictionary keywords may be encoded into one or more visual aspects of the cluster at the upper layer, such as the cluster color. The combination of keywords may be selected to be a unique combination that distinguishes the cluster from other clusters. Additionally or alternatively, the user may drill down to other layers to view other aggregate cluster information. For example, the user may drill down to view if the system identified any attributes that were correlated with the unique combination of keywords for a given cluster. A combination of keywords may be associated with a given timeframe, source of log data, domain, computing resource, and/or some other cluster attribute. Additionally or alternatively, the user may drill down to trigger automated downstream actions on all or a subset of targets in a cluster. For instance, the interactive interface may trigger the application of patches and/or other remedies for outliers among the clusters.

FIG. 4A illustrates example interactive interface 402 for viewing and navigating between different layers of data extracted from log records according to an embodiment. Interactive interface 402 indicates that over 350,000 log records have been clustered into 687 groups. A list of clusters is presented with the users with various fields, including an entity name, event description, count of log records in the cluster, start time corresponding to the first chronological log message in the cluster, end time corresponding to the last chronological log message in the cluster, cluster identifier, and the unique combination of keywords mapped to the cluster.

Figure 4B:
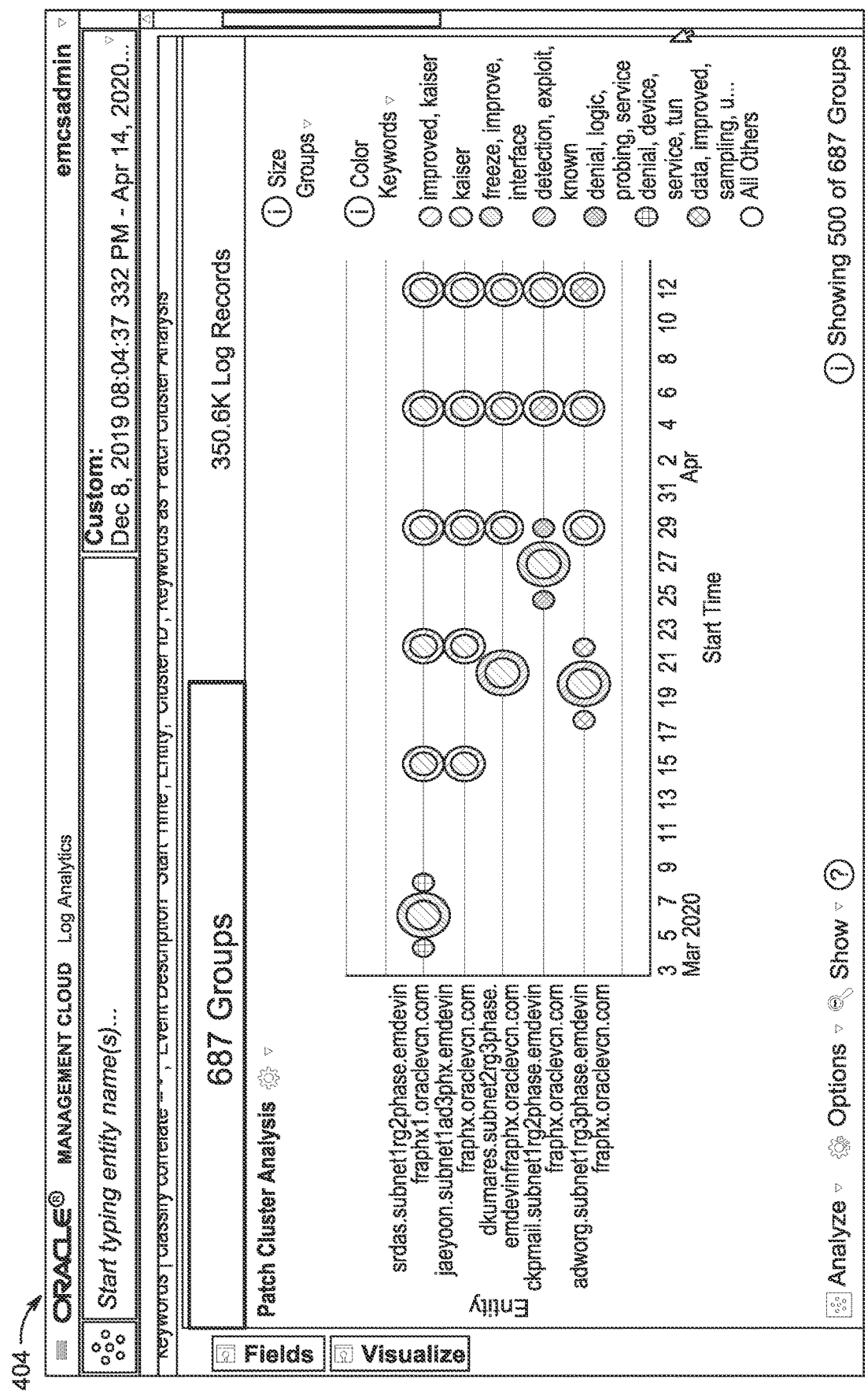
FIG. 4B illustrates an example interactive interface for visualizing and navigating between different clusters of log records in accordance with an embodiment.

FIG. 4B illustrates example interactive interface 404 for visualizing and navigating between different clusters of log records in accordance with an embodiment. Interactive interface 404 presents a patch cluster analysis that indicates recommended patches to apply based on the set of clusters. The y-axis corresponds to the entity (application name/version) and the x-axis corresponds to the cluster start-time. The size of clusters is configurable based on one or more cluster attributes, such as the number of records in the cluster. The color of the cluster corresponds to one or more keywords represented by the cluster.

Figure 4C:
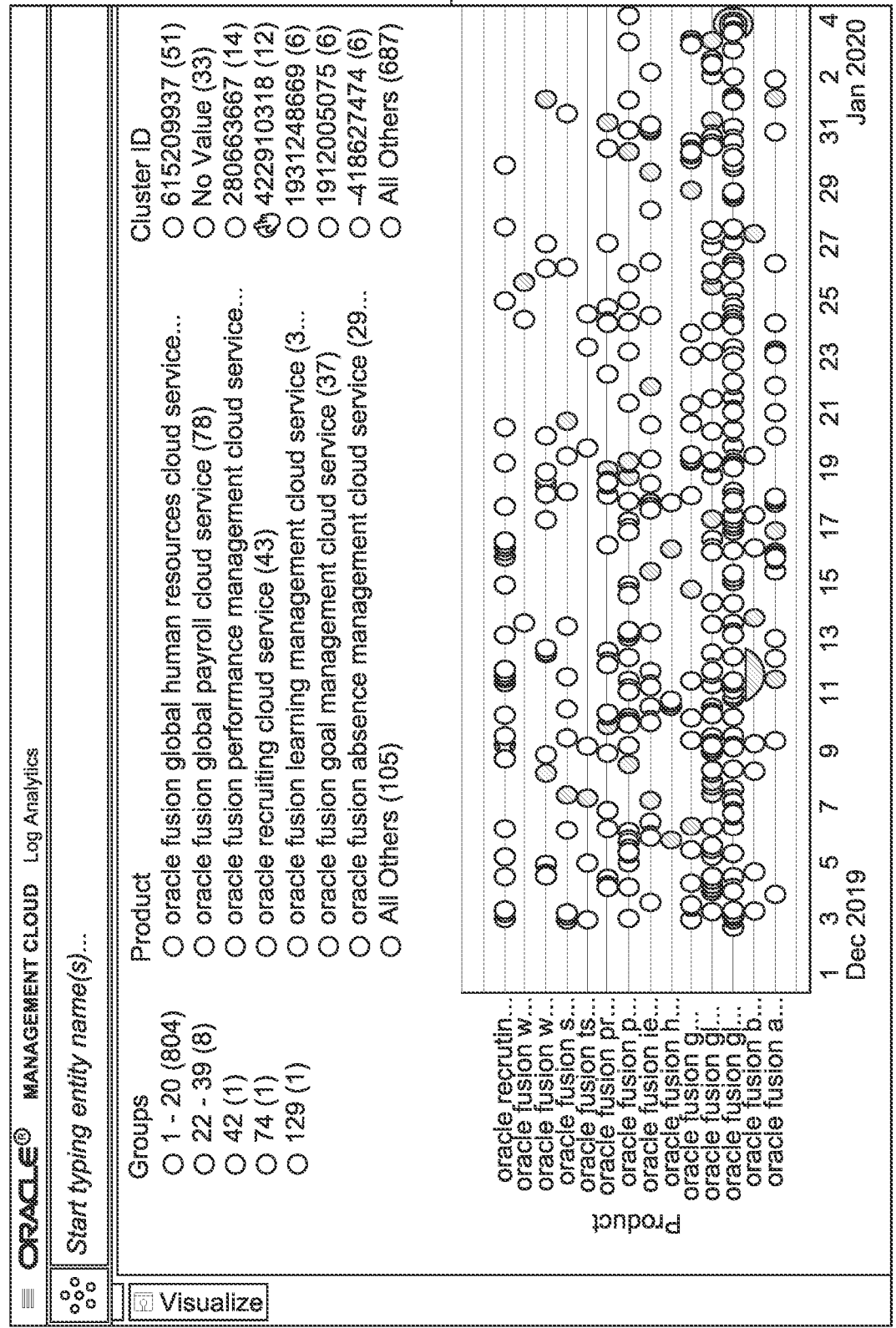
FIG. 4C illustrates an example interactive interface for filtering the clusters that are presented in accordance with an embodiment.
Figure 4C:
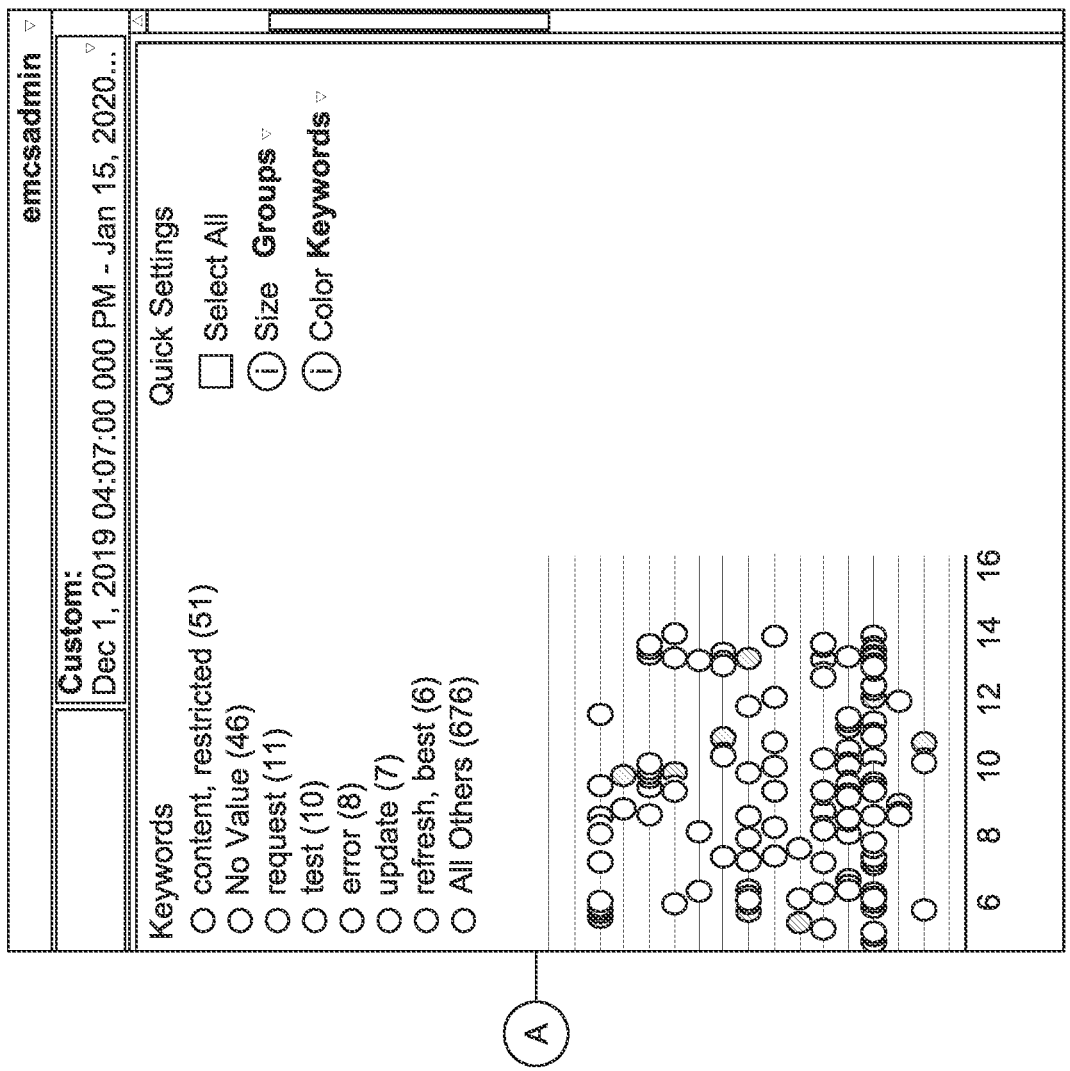

FIG. 4C illustrates example interactive interface 406 for filtering the clusters that are presented in accordance with an embodiment. Interactive interface 406 presents a set of options for filtering the set of clusters. The filters attributes include group attribute, product attributes, the cluster identifier, and keywords/tokens. The user may select the filter criteria to control which clusters are visible via the UI. For example, the user may specify a set of one or more keywords to use for filtering. In response, the UI may remove clusters that do not include the set of one or more filter keywords. Thus, only clusters that include the keywords and satisfy the filter criteria remain visible via the display, which may be helpful to reduce the amount of information presented to the user and streamline further operations.

Figure 4D:
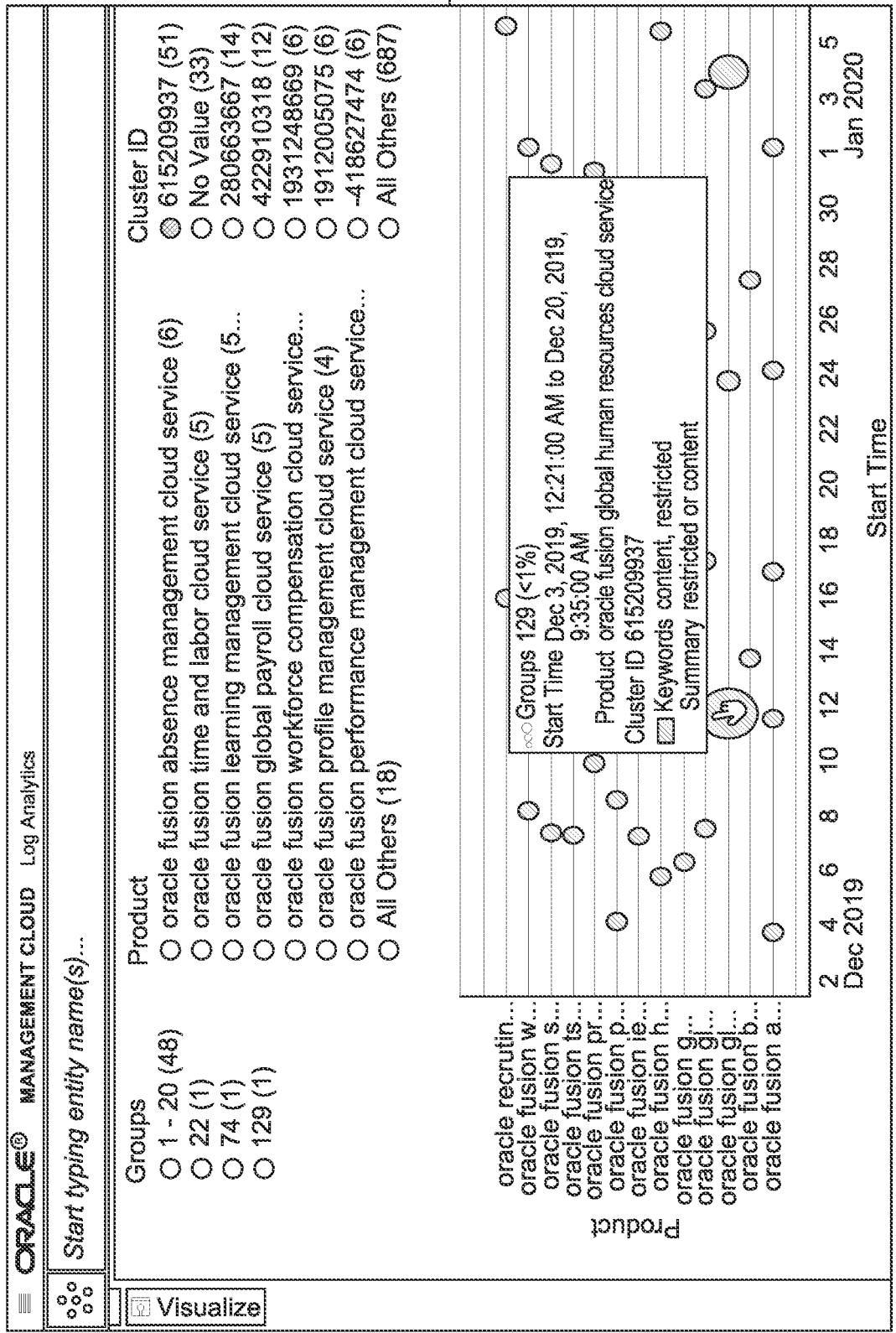
FIG. 4D illustrates an example interactive interface for drilling down into individual clusters in a filtered set of clusters in accordance with an embodiment.
Figure 4D:
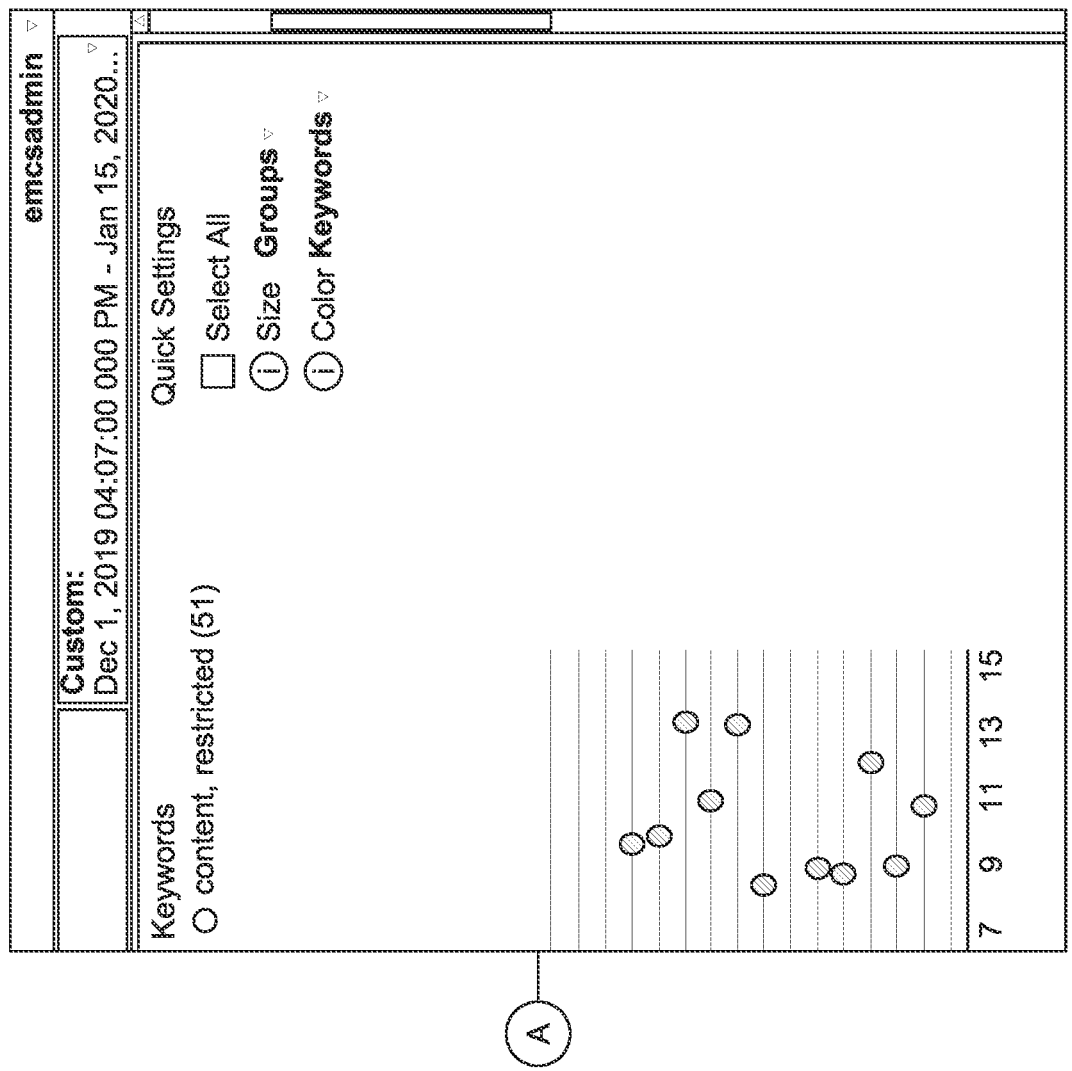

FIG. 4D illustrates example interactive interface 408 for drilling down into individual clusters in a filtered set of clusters in accordance with an embodiment. In the example, the user has selected a particular cluster identifier. Eleven sub-clusters map to the same cluster identifier representing different discrete groups across time/products that share the same unique combination of keywords. Upon hovering over one of the sub-clusters, information about the cluster is presented including a summary, start time for the sub-cluster, and summary. If the user clicks on a sub-cluster, interactive interface 408 may present additional information/options. For example, the interactive interface may present an option to trigger a patching operation on the corresponding product (depicted in the y-axis). Additionally or alternatively, the user may drill-down to view/analyze the individual log records. The user may further be presented with an option to add/remove dictionary tokens through the interactive interface.

In an embodiment, the interactive interface may be used to automatically isolate and/or debug issues. For example, the interactive interface may present links between different sets of clusters, such as between SRs and underlying log records. The interactive interface may further identify similar environments for end users that have not yet submitted a service ticket. An administrator may then select actions to execute in the similar environments, such as patching operations or other remedies, to proactively address issues in the similar environment before the end user submits a service ticket. In other embodiments, a patching operation applied in one environment may be set to automatically trigger in similar environments.

In an embodiment, the interactive interface may allow the user to analyze sets of data using different dictionaries. For example, the user may analyze a set of log data using a dictionary tailored to network problems, another dictionary tailored to database problems, and another dictionary tailored to application problems. As previously mentioned, different dictionaries may have different tokens, weights, and/or associated rules. Thus, the clusters that are presented to the user may vary depending on the selected dictionary and allow the user to quickly identify varying domain-specific issues. Recommended and/or automated actions to address problems may also vary depending on the selected dictionary. For instance, varying remedies for solving network problems may be mapped to different combinations of tokens in the network dictionary and varying remedies for solving database problems may be mapped to different combinations of tokens in the database dictionary.

6.0 Computer Networks and Cloud Networks

In an embodiment, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7.0 Microservice Applications

According to an embodiment, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In an embodiment, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to an embodiment. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In an embodiment, a plugged-in microservice application may expose actions to the microservices manager. The exposed actions may receive, as input, data or an identification of a data object or location of data, that causes data to be moved into a data cloud.

In an embodiment, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In an embodiment, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
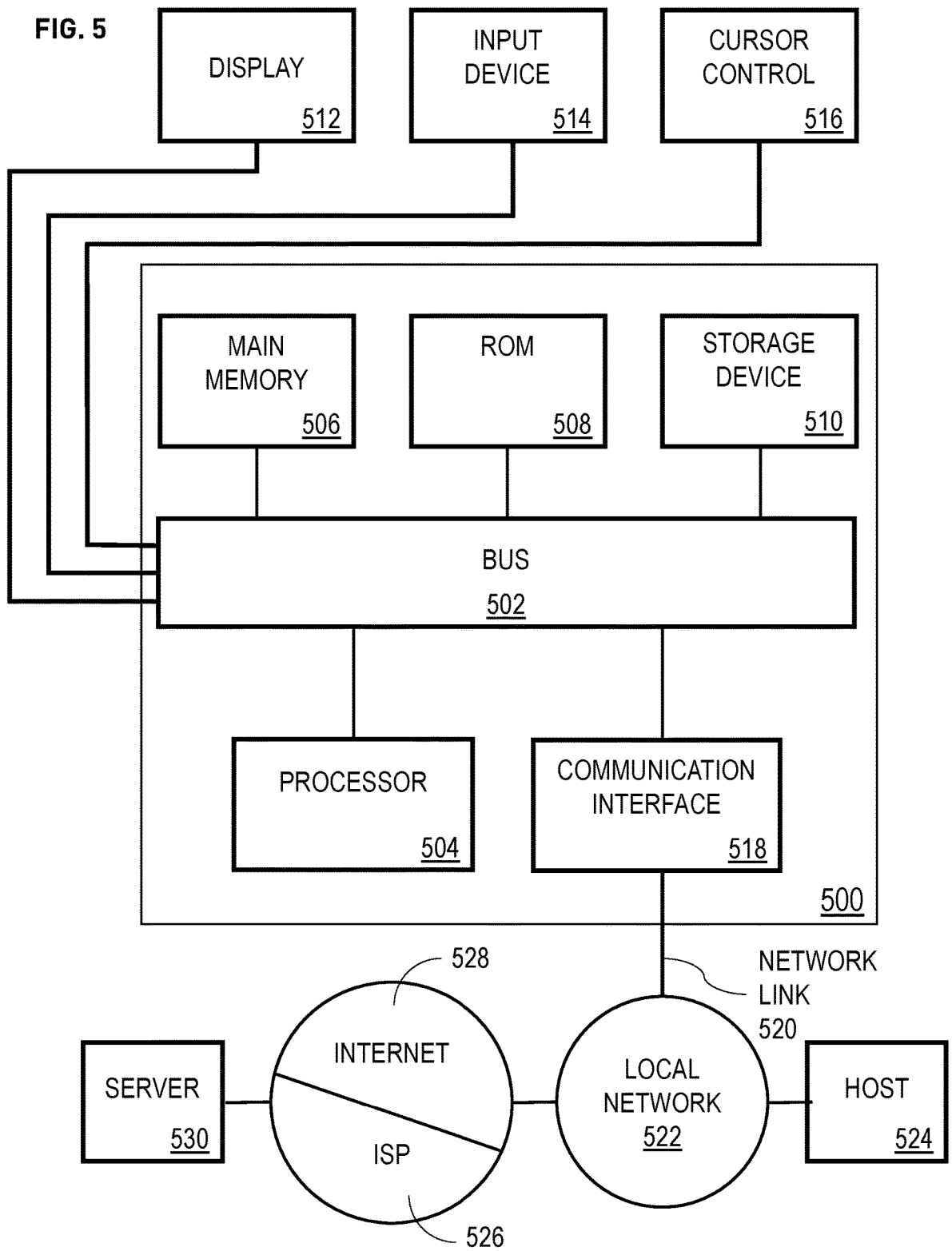
FIG. 5 shows a block diagram that illustrates a computer system in accordance with an embodiment.

For example, FIG. 5 is a block diagram that illustrates computer system 500 upon which an embodiment of the invention may be implemented. Computer system 500 includes bus 502 or other communication mechanism for communicating information, and a hardware processor 504 coupled with bus 502 for processing information. Hardware processor 504 may be, for example, a general purpose microprocessor.

Computer system 500 also includes main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes read only memory (ROM) 508 or other static storage device coupled to bus 502 for storing static information and instructions for processor 504. Storage device 510, such as a magnetic disk or optical disk, is provided and coupled to bus 502 for storing information and instructions.

Computer system 500 may be coupled via bus 502 to display 512, such as a cathode ray tube (CRT) or light emitting diode (LED) monitor, for displaying information to a computer user. Input device 514, which may include alphanumeric and other keys, is coupled to bus 502 for communicating information and command selections to processor 504. Another type of user input device is cursor control 516, such as a mouse, a trackball, touchscreen, or cursor direction keys for communicating direction information and command selections to processor 504 and for controlling cursor movement on display 512. Input device 514 typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 500 can receive the data on the network line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9.0 Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a request to cluster a set of log records that track performance of at least one computing resource;
responsive to receiving the request to cluster the set of log records, identifying at least one dictionary that is associated with a set of one or more tokens;
determining a set of one or more token weights for each token in the set of one or more tokens, wherein the set of one or more token weights are determined based at least in part on an association with performance of the at least one computing resource;
generating, based at least in part on the set of one or more tokens and at least one of the set of one or more token weights, a set of one or more clusters, wherein each cluster in the set of one or more clusters represents a unique subset of one or more tokens associated with the at least one dictionary and groups, from the set of log records, a subset of one or more log records mapped to the unique subset of one or more tokens associated with the at least one dictionary, wherein at least a first cluster maps a first subset of the log records to two or more different keyword tokens in the dictionary that are selected to represent the first cluster based at least in part on occurrences of different keywords corresponding to the two or more different keyword tokens in the first subset of the log records and the associated ion with the performance of the at least one computing resource of the different keywords corresponding to the two or more different keyword tokens;
determining at least one action associated with addressing at least one performance issue of the at least one computing resource based at least in part on the two or more different keyword tokens mapped to the first subset of log records for the first cluster, wherein the at least one action is mapped to the two or more different keyword tokens; and
performing the at least one action associated with addressing the performance issue of the at least one computing resource based on at least the first cluster in the set of one or more clusters.

2. The method of claim 1, wherein a token weight for a given token is generated, at least in part, on a sentiment associated with a corresponding token, wherein a negative sentiment associated with the performance of the at least one computing resource increases a weight given to the given token.

3. The method of claim 1, wherein the at least one dictionary includes a domain-specific dictionary generated for a particular domain, wherein a token weight associated with a corresponding token is determined, at least in part, by a meaning of the corresponding token in the particular domain.

4. The method of claim 1, wherein the at least one dictionary includes a first domain-specific dictionary generated for a first domain and a second domain-specific dictionary generated for a second domain; wherein generating the set of one or more clusters comprises generating a first set of clusters for log records associated with the first domain using the first domain-specific dictionary and generating a second set of clusters for log records associated with the second domain using the second domain-specific dictionary.

5. The method of claim 1, wherein the set of one or more clusters is generated using a first dictionary; wherein the method further comprises: generating a second set of clusters using a second dictionary that includes at least one token that is not in the first dictionary, wherein each cluster in the second set of clusters represents a unique combination of tokens from the second dictionary; wherein at least one cluster in the second set of clusters groups log records based on the at least one token that is not in the first dictionary.

6. The method of claim 1, wherein generating the set of one or more clusters comprises: selecting a first subset of tokens from the at least one dictionary based at least in part on token weights associated with tokens from the at least one dictionary; and clustering the set of log records using the first subset of tokens; wherein a second subset of tokens that have not been selected are not used to cluster the set of log records.

7. The method of claim 1, further comprising: presenting, via a first layer of an interactive interface, the set of one or more clusters; receiving, through the interactive interface, selection of a particular cluster in the set of one or more clusters; responsive to the selection, presenting, via a second layer of the interactive interface, aggregate information associated with log records mapped to the subset of one or more tokens represented by the selected cluster.

8. The method of claim 1, further comprising: receiving, from a user, a second request to add at least one token extracted from a log record to the at least one dictionary; responsive to the request, adding the token to the at least one dictionary.

9. The method of claim 1, further comprising: mapping the two or more different keyword tokens representing the first cluster to at least one descriptive label that describes at least one behavior represented by the particular cluster.

10. The method of claim 1, wherein the at least one action comprises at least one of presenting a recommended remedy to address behavior represented by the first cluster, applying a patch to one or more resources associated with the first cluster, or adjusting one or more configuration settings associated with the one or more resources associated with the first cluster.

11. The method of claim 1, wherein at least one record in the subset of log records does not include an exact match to the two or more different keyword tokens representing the first cluster; wherein the at least one record is included in the subset of log records based on a similarity between an extracted keyword and at least one keyword of the two or more different keyword tokens.

12. A non-transitory computer-readable medium storing instructions which, when executed by one or more hardware processors, cause:
receiving a request to cluster a set of log records that track performance of at least one computing resource;
responsive to receiving the request to cluster the set of log records, identifying at least one dictionary that is associated with a set of one or more tokens;
determining a set of one or more token weights for each token in the set of one or more tokens, wherein the set of one or more token weights are determined based at least in part on an association with performance of the at least one computing resource;
generating, based at least in part on the set of one or more tokens and at least one of the set of one or more token weights, a set of one or more clusters, wherein each cluster in the set of one or more clusters represents a unique subset of one or more tokens associated with the at least one dictionary and groups, from the set of log records, a subset of one or more log records mapped to the unique subset of one or more tokens associated with the at least one dictionary, wherein at least a first cluster maps a first subset of the log records to two or more different keyword tokens in the dictionary that are selected to represent the first cluster based at least in part on occurrences of different keywords corresponding to the two or more different keyword tokens in the first subset of the log records and the association with the performance of the at least one computing resource of the different keywords corresponding to the two or more different keyword tokens;
determining at least one action associated with addressing at least one performance issue of the at least one computing resource based at least in part on the two or more different keyword tokens mapped to the first subset of log records for the first cluster, wherein the at least one action is mapped to the two or more different keyword tokens; and
performing the at least one action associated with addressing the performance issue of the at least one computing resource based on at least the first cluster in the set of one or more clusters.

13. The non-transitory computer-readable medium of claim 12, wherein a token weight for a given token is generated, at least in part, on a sentiment associated with a corresponding token, wherein a negative sentiment associated with the performance of the at least one computing resource increases a weight given to the given token.

14. The non-transitory computer-readable medium of claim 12, wherein the at least one dictionary includes a domain-specific dictionary generated for a particular domain, wherein a token weight associated with a corresponding token is determined, at least in part, by a meaning of the corresponding token in the particular domain.

15. The non-transitory computer-readable medium of claim 12, wherein the at least one dictionary includes a first domain-specific dictionary generated for a first domain and a second domain-specific dictionary generated for a second domain; wherein generating the set of one or more clusters comprises generating a first set of clusters for log records associated with the first domain using the first domain-specific dictionary and generating a second set of clusters for log records associated with the second domain using the second domain-specific dictionary.

16. The non-transitory computer-readable medium of claim 12, wherein the set of one or more clusters is generated using a first dictionary; wherein the method further comprises: generating a second set of clusters using a second dictionary that includes at least one token that is not in the first dictionary, wherein each cluster in the second set of clusters represents a unique combination of tokens from the second dictionary; wherein at least one cluster in the second set of clusters groups log records based on the at least one token that is not in the first dictionary.

17. The non-transitory computer-readable medium of claim 12, wherein generating the set of one or more clusters comprises: selecting a first subset of tokens from the at least one dictionary based at least in part on token weights associated with tokens from the at least one dictionary; and clustering the set of log records using the first subset of tokens; wherein a second subset of tokens that have not been selected are not used to cluster the set of log records.

18. The non-transitory computer-readable medium of claim 12, further comprising: presenting, via a first layer of an interactive interface, the set of one or more clusters; receiving, through the interactive interface, selection of a particular cluster in the set of one or more clusters; responsive to the selection, presenting, via a second layer of the interactive interface, aggregate information associated with log records mapped to the subset of one or more tokens represented by the selected cluster.

19. The non-transitory computer-readable medium of claim 12, further comprising: receiving, from a user, a second request to add at least one token extracted from a log record to the at least one dictionary; responsive to the request, adding the token to the at least one dictionary.

20. The non-transitory computer-readable medium of claim 12, further comprising: mapping the two or more different keyword tokens representing the first to at least one descriptive label that describes at least one behavior represented by the particular cluster.

* * * * *

UNITED STATES PATENT AND TRADEMARK OFFICE
CERTIFICATE OF CORRECTION

PATENT NO. : 11,853,340 B2
APPLICATION NO. : 17/183746
DATED : December 26, 2023
INVENTOR(S) : Kumaresan et al.

Page 1 of 1

It is certified that error appears in the above-identified patent and that said Letters Patent is hereby corrected as shown below:

In the Claims

In Column 24, Line 31, in Claim 1, delete "associated ion" and insert -- association --, therefor.

In Column 27, Line 13, in Claim 20, after "first" insert -- cluster --, therefor.

Signed and Sealed this
Seventh Day of May, 2024

Katherine Kelly Vidal
*Director of the United States Patent and Trademark Office*